United States Patent
Isaka et al.

(10) Patent No.: US 8,344,192 B2
(45) Date of Patent: Jan. 1, 2013

(54) PROCESS FOR THE RECOVERY OF FLUOROMONOMERS

(75) Inventors: Tadaharu Isaka, Settsu (JP); Tadashi Ino, Settsu (JP); Masaharu Nakazawa, Settsu (JP); Masahiro Kondo, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 419 days.

(21) Appl. No.: 12/514,961

(22) PCT Filed: Dec. 7, 2007

(86) PCT No.: PCT/JP2007/073658
§ 371 (c)(1),
(2), (4) Date: May 14, 2009

(87) PCT Pub. No.: WO2008/069301
PCT Pub. Date: Jun. 12, 2008

(65) Prior Publication Data
US 2010/0048956 A1    Feb. 25, 2010

(30) Foreign Application Priority Data

| Dec. 8, 2006 | (JP) | 2006-332525 |
| Jun. 6, 2007 | (JP) | 2007-150877 |
| Jun. 6, 2007 | (JP) | 2007-150878 |
| Jun. 6, 2007 | (JP) | 2007-150879 |

(51) Int. Cl.
C08F 2/00 (2006.01)
C08F 12/20 (2006.01)
C08F 14/14 (2006.01)
C08G 75/00 (2006.01)
C08G 73/24 (2006.01)
C07C 315/00 (2006.01)
C07C 17/00 (2006.01)
C07C 25/13 (2006.01)
C07C 21/18 (2006.01)
C07C 17/38 (2006.01)

(52) U.S. Cl. ........ 570/177; 570/123; 570/138; 570/178; 568/27; 526/72; 526/242; 526/291; 528/391; 528/401

(58) Field of Classification Search .................. None
See application file for complete search history.

(56) References Cited

U.S. PATENT DOCUMENTS

| 3,282,875 | A | * | 11/1966 | Connolly et al. | 524/795 |
| 4,358,412 | A | * | 11/1982 | Ezzell et al. | 558/142 |
| 4,940,525 | A | * | 7/1990 | Ezzell et al. | 204/252 |
| 5,182,342 | A | * | 1/1993 | Feiring et al. | 526/206 |
| 5,237,049 | A | | 8/1993 | Cavanaugh et al. | |
| 6,395,848 | B1 | * | 5/2002 | Morgan et al. | 526/214 |
| 6,750,304 | B2 | * | 6/2004 | Kaspar et al. | 526/209 |
| 6,846,904 | B1 | | 1/2005 | Imanishi et al. | |
| 6,869,997 | B2 | * | 3/2005 | Wille et al. | 524/544 |
| 2003/0023015 | A1 | | 1/2003 | Tatemoto et al. | |

FOREIGN PATENT DOCUMENTS

| JP | 56059810 A | 5/1981 |
| JP | 06-032816 A | 2/1994 |
| JP | 07-118332 A | 5/1995 |
| JP | 08-500628 A | 1/1996 |
| JP | 11-035624 A | 2/1999 |
| JP | 2000-344825 A | 12/2000 |
| JP | 2001-064317 A | 3/2001 |
| JP | 2001-226436 A | 8/2001 |
| WO | 9405706 A2 | 3/1994 |
| WO | 2005028522 A1 | 3/2005 |

OTHER PUBLICATIONS

Arcella, V. et al., "Hyflon ion membranes for fuel cells," Ind. Eng. Chem. (2005) 44: 7646-7651.*

* cited by examiner

Primary Examiner — Porfirio Nazario Gonzalez
Assistant Examiner — James Meadows
(74) Attorney, Agent, or Firm — Sughrue Mion, PLLC (57) ABSTRACT

The invention provides a technique enabling the separation and recovery of an unreacted fluoromonomer from an aqueous fluoropolymer dispersion obtained by emulsion polymerization, without using any extraction solvent, and enabling the prevention of a hydrolysis of —$SO_2F$ and a like sulfonic acid precursor functional group convertible to sulfonic acid group. Thus, the invention provides a recovering method fluoromonomer having a sulfonic acid precursor functional group convertible to a sulfonic acid group and remaining unreacted from an aqueous fluoropolymer dispersion obtained by emulsion polymerization of the fluoromonomer, wherein the unreacted fluoromonomer is recovered from the aqueous fluoropolymer dispersion by evaporation, wherein the aqueous fluoropolymer dispersion has an acidic pH.

4 Claims, 1 Drawing Sheet

PROCESS FOR THE RECOVERY OF FLUOROMONOMERS

TECHNICAL FIELD

The present invention relates to a recovering method of fluoromonomer.

BACKGROUND ART

A fluoropolymer is produced by such methods as emulsion polymerization, suspension polymerization, solution polymerization and bulk polymerization, among others. Among them, an emulsion polymerization method is advantageous in a heat removability during polymerization and a low torque for stirring, since the volume efficiency of the polymerization vessel is high.

From an economical viewpoint, among others, it is preferred that the unreacted monomer or monomers not consumed in the polymerization reaction in emulsion polymerization be recovered for reuse thereof. Among such unreacted monomers, monomers which are gaseous at ordinary temperature, for example tetrafluoroethylene [TFE], can be readily separated and recovered as a gaseous phase after polymerization. On the other hand, it is not easy to separate and recover unreacted monomers which are liquid at ordinary temperature from the aqueous dispersion resulting from emulsion polymerization.

Known as a recovering method of unreacted monomers which are liquid at ordinary temperature is a method comprising recovering the unreacted monomer or monomers from the latex obtained by emulsion polymerization of a fluorinated monomer or monomers using a chlorofluorinated saturated hydrocarbon (CFC) as an extraction solvent (cf. e.g. Patent Document 1), the method comprising using, as an extraction solvent, such a fluorinated solvent as $CF_2ClCF_2CFHCl$, $CF_3CF_2CHCl_2$, a hydrofluorocarbon or a fluorocarbon (cf. e.g. Patent Document 2) and the method comprising using a hydrofluoroether compound as an extraction solvent (cf. e.g. Patent Document 3).

When unreacted monomer separation is carried out using an extraction solvent, however, a problem arises; namely the extraction solvent remains in an aqueous dispersion after solvent extraction and causes troubles in an subsequent steps of processing. For avoiding such problem, it is necessary to evaporate the extraction solvent remaining in the aqueous dispersion (cf. e.g. Patent Document 4). For unreacted monomer reutilization, it is also necessary to isolate an unreacted monomer or monomers dissolved in the extraction solvent. For avoiding such economical and time burdens, it is preferred that unreacted monomer recovery can be made without using any extraction solvent.

A fluoropolymer obtained by emulsion polymerization of a fluoromonomer having a sulfonic acid precursor functional group convertible to a sulfonic acid group, for example $—SO_2F$, is known to be useful as a electrolyte membrane for fuel cells, chemical sensors and so forth. Such a sulfonic acid precursor functional group-containing fluoropolymer obtained in the form of an aqueous dispersion by emulsion polymerization, in the condition of an aqueous dispersion, undergoes the reaction converting, by hydrolysis by water, a slight proportion of the sulfonic acid precursor functional group to a sulfonic acid group ($—SO_3M$; M representing H, $NR^1R^2R^3R^4$ or $M^1_{1/L}$ where $R^1$, $R^2$, $R^3$ and $R^4$ are the same or different and each represents H or an alkyl group containing 1 to 4 carbon atoms and $M^1$ represents a metal having a valence of L) (cf. e.g. Patent Document 5).

Therefore, a problem arises; namely, the hydrolysis gives the sulfonic acid group ($—SO_3M$) lower in thermal stability than the sulfonic acid precursor functional group, causing thermal decomposition-due discoloration in the step of melt molding of the fluoropolymer. Another problem also arises; namely, even when the sulfonic acid-derived group-containing fluoropolymer is prepared in the form of a solid such as a powder, pellets or a molded article via drying treatment, the polymer immediately absorbs moisture in the air since the sulfonic acid groups ($—SO_3M$) are highly hygroscopic, with the result that the moisture absorbed may cause foaming in the step of melt molding.

Sulfonic acid precursor functional group-containing fluoropolymers can be inhibited from undergoing discoloration and/or causing foaming in the step of melt molding by bringing them into contact with a fluorine radical-generating compound so that such unstable groups as $—SO_3M$ and $—COOH$ at polymer chain termini may be fluorinated. However, since $—SO_3M$ groups exist abundantly, another problem arises; namely a water absorbed inhibits the fluorination.

There is a further problem; namely, the sulfonic acid precursor functional groups occurring in the fluoromonomer are hydrolyzed, so that a rate of unreacted monomer recovery is reduced.

[Patent Document 1] Japanese Kokai Publication S56-59810
[Patent Document 2] Japanese Kokai Publication H07-118332
[Patent Document 3] Japanese Kokai Publication H11-35624
[Patent Document 4] Japanese Kokai Publication 2000-344825
[Patent Document 5] International Publication WO 2005/028522

DISCLOSURE OF INVENTION

Problems which the Invention is to Solve

In view of the above-discussed state of the art, it is an object of the present invention to provide a technology enabling a separation and recovery of an unreacted fluoromonomer from an aqueous fluoropolymer dispersion obtained by emulsion polymerization, without using any extraction solvent, and enabling the prevention of a hydrolysis of $—SO_2F$ and a like sulfonic acid precursor functional group convertible to a sulfonic acid group.

Means for Solving the Problems

The present invention is a recovering method of a fluoromonomer having a sulfonic acid precursor functional group convertible to a sulfonic acid group and remaining unreacted from an aqueous fluoropolymer dispersion obtained by emulsion polymerization of the fluoromonomer, wherein the unreacted fluoromonomer is recovered from the aqueous fluoropolymer dispersion by evaporation, wherein the aqueous fluoropolymer dispersion has an acidic pH.

The invention relates to a recovering method of an unreacted fluoromonomer having a sulfonic acid precursor functional group convertible to a sulfonic acid group from an aqueous fluoropolymer dispersion obtained by emulsion polymerization of the fluoromonomer.

The recovering method according to the invention is characterized in that the unreacted fluoromonomer is recovered from the aqueous fluoropolymer dispersion by evaporation and that the aqueous fluoropolymer dispersion has an acidic pH during fluoromonomer recovery. The recovering method according to the invention can prevent a hydrolysis of a sulfonic acid precursor functional group by adjusting the aqueous fluoropolymer dispersion to an acidic pH and therefore can inhibit the fluoropolymer from being discolored and/or causing foaming in the step of melt molding using the fluoropolymer; thus, the fluoropolymer can be obtained in a form suited for use as an electrolyte membrane material and, furthermore, a rate of recovery of the unreacted fluoromonomer can be improved.

The recovering method according to the invention, which comprises recovering the above-mentioned unreacted fluoromonomer from the aqueous fluoropolymer dispersion by evaporation, makes it possible to recover the fluoromonomer without using any extraction solvent, unlike the conventional art.

The aqueous fluoropolymer dispersion is obtained by emulsion polymerization of a fluoromonomer, and the fluoromonomer has a sulfonic acid precursor functional group convertible to a sulfonic acid group.

The sulfonic acid precursor functional group is convertible, by a hydrolysis reaction, to a sulfonic acid group ($-SO_3M$; M representing H, $NR^1R^2R^3R^4$ or $M^1_{1/L}$ where $R^1$, $R^2$, $R^3$ and $R^4$ are the same or different and each represents H or an alkyl group containing 1 to 4 carbon atoms and $M^1$ represents a metal having a valence of L). Preferred as the sulfonic acid precursor functional group is the group $-SO_2X$ (X representing F or Cl).

In the above group $-SO_2X$, X is preferably F.

The sulfonic acid precursor functional group-containing fluoromonomer mentioned above is preferably a fluorovinyl compound represented by the general formula (I):

$$CF_2=CF-(A)_l-(CF_2CFY^1-O)_n-(CFY^2)_m-SO_2X \quad (I)$$

wherein $Y^1$ represents F, Cl or a perfluoroalkyl group; n is 0 or 1; $Y^2$ represents F, Cl or a perfluoroalkyl group; m represents an integer of 0 to 5 when n is 0 or represents an integer of 1 to 5 when n is 1 and, when m represents an integer of 2 to 5, the m atoms of $Y^2$ moieties may be the same or different; X represents F or Cl; A represents $-O-$ or $-CF_2O-$; and l is 0 or 1.

In the above general formula (I), $Y^1$ is preferably a perfluoroalkyl group, more preferably a perfluoroalkyl group containing 1 to 3 carbon atoms, still more preferably $-CF_3$ group. $Y^2$ is preferably F.

One or two or more species of the fluorovinyl compound mentioned above may be used singly or in combination.

The aqueous fluoropolymer dispersion is preferably one obtained by emulsion polymerization of the sulfonic acid precursor functional group-containing fluoromonomer and an ethylenic fluoromonomer. The ethylenic fluoromonomer is not particularly restricted provided that it is a monomer copolymerizable with the sulfonic acid precursor functional group-containing fluoromonomer.

The ethylenic fluoromonomer mentioned above is a vinyl group-containing monomer in which the hydrogen atoms in the vinyl group may be partially or fully substituted by one or more fluorine atoms.

As the ethylenic fluoromonomer, there may be mentioned, for example, ethylenic fluoromonomers represented by the general formula (II):

$$CF_2=CF-R_f^2 \quad (II)$$

(wherein $R_f^2$ represents F, Cl or a straight or branched fluoroalkyl group containing 1 to 9 carbon atoms) and hydrogen-containing ethylenic fluoromonomers represented by the general formula (III):

$$CHY^3=CFY^4 \quad (III)$$

(wherein $Y^3$ represents H or F and $Y^4$ represents H, F, Cl or a straight or branched fluoroalkyl group containing 1 to 9 carbon atoms).

As the ethylenic fluoromonomer represented by the general formula (II) or (III), there may be mentioned, for example, tetrafluoroethylene [TFE], hexafluoropropylene [HFP], chlorotrifluoroethylene [CTFE], vinyl fluoride, vinylidene fluoride [VDF], trifluoroethylene, hexafluoroisobutylene and perfluorobutylethylene; among them, TFE, VDF, CTFE, trifluoroethylene, vinyl fluoride and HFP are preferred, TFE, CTFE and HFP are more preferred, TFE and HFP are still more preferred, and TFE is most preferred.

The ethylenic fluoromonomer may be a monomer having a cyclic structure or a cyclopolymerizable monomer.

As the monomer having a cyclic structure, there may be mentioned perfluoro(2,2-dimethyl-1,3-dioxole), perfluoro(1,3-dioxole), perfluoro(2-methylene-4-methyl-1,3-dioxolane) and 2,2,4-trifluoro-5-trifluoromethoxy-1,3-dioxole, among others.

As the cyclopolymerizable monomer, there may be mentioned perfluoro(3-butenyl vinyl ether), perfluoro [(1-methyl-3-butenyl) vinyl ether], perfluoro (allyl vinyl ether) and 1,1'-[(difluoromethylene)bis(oxy)][1,2,2-trifluoroethene], among others.

As the above-mentioned ethylenic fluoromonomer, there may further be mentioned perfluorovinyl ethers represented by the general formula (IV):

$$CF_2=CF-O-R_f^3 \quad (IV)$$

(wherein $R_f^3$ represents a fluoroalkyl group containing 1 to 9 carbon atoms or a fluoropolyether group containing 1 to 9 carbon atoms), hydrogen-containing vinyl ethers represented by the general formula (V):

$$CHY^5=CF-O-R_f^4 \quad (V)$$

(wherein $Y^5$ represents H or F and $R_f^4$ represents a straight or branched fluoroalkyl group containing 1 to 9 carbon atoms, which may optionally contain at least one ether group), and a fluoromonomer represented by the general formula (I) given above in which X is $-NR^5R^6$ (in which $R^5$ and $R^6$ are the same or different and each represents H, an alkyl group or a sulfonyl-containing group).

One or two or more species of the above-mentioned ethylenic fluoromonomer may be used.

A fluoropolymer obtained by polymerization of the sulfonic acid precursor functional group-containing fluoromonomer and the ethylenic fluoromonomer is preferably a copolymer with the sulfonic acid precursor functional group-containing fluoromonomer-derived repeating unit content of 5 to 50 mole percent and the ethylenic fluoromonomer-derived repeating unit content of 50 to 95 mole percent.

In the present specification, the content of each unit is the value calculated based on the all monomer units taken as 100 mole percent. The "all monomer units" means all monomer-derived moieties constituting the molecular structure of the fluoropolymer. The content of each unit is the value obtained by molten state NMR spectrometry at 300° C.

The above-mentioned emulsion polymerization can be carried out by any of a method known in the art, and a polymerization condition can be properly selected according to the respective monomer species, the amounts thereof and a desired composition, among others.

The above-mentioned aqueous fluoropolymer dispersion obtained by the emulsion polymerization may be an virgin aqueous fluoropolymer dispersion or one obtained by subjecting the same to such after-treatment as concentration and/or coagulation. It may also be an aqueous fluoropolymer dispersion obtained by reducing an aqueous medium proportion by subjecting the aqueous fluoropolymer dispersion after polymerization to coagulation and washing or to coagulation, washing and dehydration.

The recovering method according to the invention recovers the unreacted fluoromonomer mentioned above which remains unconsumed in a polymerization reaction in the above-mentioned emulsion polymerization from an aqueous fluoropolymer dispersion which has an acidic pH.

The aqueous fluoropolymer dispersion mentioned above is not particularly restricted but may be any of those has an acidic pH on the occasion of recovering the fluoromonomer by evaporation; it is preferably one obtained by emulsion polymerization in an aqueous medium having an acidic pH or one obtained by adjusting the aqueous fluoropolymer dispersion as obtained after emulsion polymerization to an acidic pH.

By making a pH of the aqueous fluoropolymer dispersion acidic in accordance with the recovering method according to the invention, it becomes possible to inhibit a conversion, by hydrolysis, of sulfonic acid precursor functional groups occurring in the product polymer and unreacted monomers to sulfonic acid groups ($-SO_3M$).

The time at which a pH of the aqueous medium is to be adjusted in the emulsion polymerization is not particularly restricted; it is only required that the aqueous medium be adjusted to an acidic pH at the time of completion of the polymerization reaction. Alternatively, it is also possible to adjust the aqueous medium to an acidic pH in advance and then carry out the emulsion polymerization.

As the acidic pH value of the aqueous sulfonic acid precursor functional group-containing fluoropolymer dispersion is reduced to a lower level, the hydrolysis-inhibiting effect becomes enhanced; for obtaining a more significant effect, the pH of the aqueous fluoropolymer dispersion is preferably lower than 3.0. The pH is more preferably 2.5 or lower, still more preferably 2.0 or lower, particularly preferably 1.8 or lower, most preferably 1.5 or lower.

The aqueous fluoropolymer dispersion has an acidic pH may also be one obtained by adjusting a pH of the aqueous fluoropolymer dispersion obtained by ordinary emulsion polymerization to an acidic level.

While the hydrolysis-inhibiting effect becomes enhanced as the acidic pH value of the aqueous sulfonic acid precursor functional group-containing fluoropolymer dispersion is reduced to a lower level, the pH is preferably lower than 3.0 so that the more significant effect may be obtained. Even when the pH of the aqueous sulfonic acid precursor functional group-containing fluoropolymer dispersion is higher than 3.0, for example, the hydrolysis-inhibiting effect can be observed by lowering the pH of the aqueous fluoropolymer dispersion to a level lower than the original value; for producing the more significant effect, however, the pH is preferably lower than 3.0.

When the aqueous fluoropolymer dispersion has a pH of 3.0 or higher, it is preferred that the pH be lowered to a level lower than 3.0, preferably to 2.5 or lower, more preferably to 2.0 or lower, still more preferably to 1.8 or lower, particularly preferably to 1.5 or lower.

When the aqueous sulfonic acid precursor functional group-containing fluoropolymer dispersion has a pH lower than 3.0, a still more enhanced effect can be obtained by lowering the pH to a still smaller value. For example, when the aqueous fluoropolymer dispersion has a pH lower than 3.0 but higher than 2.0, it is preferred that the pH be reduced to a lower level, more preferably to 2.0 or lower, still more preferably to 1.8 or lower, particularly preferably to 1.5 or lower.

In a case of adjusting the pH of the aqueous fluoropolymer dispersion obtained by polymerization, the lower limit to the pH value is not particularly restricted. However, when an attempt is made to lower the pH excessively, the amount of the acidic compound to be added becomes large; therefore, it is advantageous from the process viewpoint that the pH of the dispersion be not lower than −1.0. In cases where the pH of the aqueous fluoropolymer dispersion obtained by polymerization is adjusted, the fluoropolymer dispersed in the aqueous fluoropolymer dispersion may aggregate or coagulate in the process of pH adjustment; in this case, the hydrolysis of the sulfonic acid precursor functional groups occurring in the fluoropolymer can be further prevented with greater advantage.

The pH adjustment mentioned above can be accomplished by the addition of an acidic compound or by adding a compound decomposable in water to give an acidic compound. One or a plurality of inorganic acids or organic acids can be properly used as the acidic compound. Preferred as the acidic compound in view of the easiness of adjusting the pH to a level within a desired acidic range is a compound having a pKa smaller than 7; for example, there may be mentioned nitric acid, phosphoric acid, sulfuric acid, hydrochloric acid and trifluoroacetic acid ($CF_3COOH$). Such acidic compounds may also be used in combination with another compound.

The above-mentioned emulsion polymerization can be carried out by any of the methods known in the art, and the polymerization conditions can be properly selected according to the respective monomer species, the amounts thereof and the desired composition, among others. In the emulsion polymerization, a surfactant, a polymerization initiator and/or one or more of other additives may be added.

The surfactant is not particularly restricted but may be any of those known in the art; however, fluorinated surfactants such as perfluorooctanoic acid salts are preferred among others.

The aqueous medium is not particularly restricted but may be, for example, water or a mixed liquid composed of water and one or more of known water-soluble solvents; it may further contain an organic solvent. Water is preferred, however.

The recovering method according to the invention recovers the above-mentioned unreacted fluoromonomer from an aqueous fluoropolymer dispersion has an acidic pH by evaporation. The method of causing evaporation is not particularly restricted but may comprise an appropriate combination of heating and pressure reduction. The combination of heating and pressure reduction is preferred since it makes it possible to lower the heating temperature and improve a efficiency of the recovery.

While a tendency for the sulfonic acid precursor functional groups occurring in the fluoropolymer and fluoromonomer to be hydrolyzed and converted to the sulfonic acid groups ($-SO_3M$) increases with the rise of temperature of the aqueous fluoropolymer dispersion, the recovering method according to the invention, by making the aqueous fluoropolymer dispersion acidic, can inhibit the hydrolysis even upon heating for evaporation of the fluoromonomer.

The method for the above-mentioned recovery is not particularly restricted but may comprise cooling the fluoromonomer to a temperature lower than the boiling point of the same for liquefaction and a recovering the same.

The recovering method according to the invention can be suitably used in a manufacture of an electrolyte membrane material for use in a fuel cell, a chemical sensor and so forth.

The aqueous fluoropolymer dispersion mentioned above can be obtained particularly preferably by one of the aqueous fluoropolymer dispersion production methods (1) to (3) mentioned below.

The aqueous fluoropolymer dispersion production method (1) is an aqueous fluoropolymer dispersion production method comprising emulsion polymerization, in the aqueous medium, of a fluoromonomer having a sulfonic acid precursor functional group convertible to the sulfonic acid group and wherein the emulsion polymerization is carried out while the aqueous medium is adjusted to a pH of 0.5 to 3.0.

The aqueous fluoropolymer dispersion production method (1) is characterized in that the emulsion polymerization is carried out in an aqueous medium adjusted to an acidic pH of 0.5 to 3.0. By carrying out the emulsion polymerization in an aqueous medium positively adjusted to an acidic pH of 0.5 to 3.0, the production method (1) can inhibit the hydrolysis of sulfonic acid precursor functional groups, hence the conversion thereof to sulfonic acid groups ($-SO_3M$; M representing H, $NR^1R^2R^3R^4$ or $M^1_{1/L}$ in which $R^1$, $R^2$, $R^3$ and $R^4$ are the same or different and each represents H or an alkyl group containing 1 to 4 carbon atoms and $M^1$ represents a metal having a valence of L). Therefore, the aqueous fluoropolymer dispersion produced by the production method (1) can be suitably used as the electrolyte membrane material, since the sulfonic acid group formation is suppressed and prevent the problem of discoloration and/or foaming on the occasion of melt molding.

It is known, among others, that, in emulsion polymerization, the aqueous medium is adjusted to the pH around neutrality by adding a buffer agent on the occasion of polymerization, for the purpose of maintaining an initiator efficiency in polymerization at a constant level, among others. In processes for sulfonic acid precursor functional group-containing fluoropolymer production by emulsion polymerization of a fluoromonomer having a sulfonic acid precursor functional group convertible to the sulfonic acid group, for example $-SO_2F$, too, the pH of the aqueous medium is adjusted to the vicinity of neutrality by adding the buffer agent (e.g. $Na_2HPO_4$, $NaH_2PO_4$, etc.) on the occasion of polymerization (cf. e.g. U.S. Pat. No. 4,330,654, Japanese Kokai Publications S63-297406, H11-35624 and 2004-18673, etc.).

According to the production method (1), contrary to such conventional art technologies as mentioned above, the pH of the medium is positively adjusted to an acidic condition (pH 0.5 to 3.0) by adding an acidic compound to the system and the emulsion polymerization is carried out.

The production method (1) makes it possible to inhibit the hydrolysis of the sulfonic acid precursor functional group and thereby inhibit the conversion thereof to the sulfonic acid group by adjusting the aqueous medium to an acidic pH and carrying out the emulsion polymerization and, as the pH value of the medium is more and more decreased, the hydrolysis-inhibiting effect grows; for obtaining a more significant effect, the pH is preferably lower than 3.0. The pH is more preferably 2.5 or lower, still more preferably 2.0 or lower, particularly preferably 1.8 or lower.

According to the production method (1), the hydrolysis-inhibiting effect is obtained by decreasing the pH value of the aqueous medium to a lower level; however, as the pH of the aqueous medium is lowered, the dispersion stability of the aqueous fluoropolymer dispersion during emulsion polymerization declines. Therefore, the pH of the aqueous fluoropolymer dispersion is preferably not lower than 0.5, more preferably not lower than 0.8, still more preferably not lower than 1.0.

In carrying out the production method (1), the pH of the aqueous medium is preferably adjusted at all stages from the start of polymerization to the end of the polymerization reaction so that the pH may be maintained at a level lower than 3.0, more preferably 2.5 or lower, still more preferably 2.0 or lower, particularly preferably 1.8 or lower.

The aqueous fluoropolymer dispersion production method (2) is a method of aqueous fluoropolymer dispersion production which comprises subjecting a fluoromonomer having the sulfonic acid precursor functional group convertible to the sulfonic acid group to emulsion polymerization in the aqueous medium, and the emulsion polymerization is characterized in that an acidic compound is added, as an acidifying agent, to the polymerization system during polymerization so that the pH of the aqueous medium at the time of completion of the polymerization may be lower than the pH at the time of initiation of the polymerization.

According to the production method (2), the hydrolysis of the sulfonic acid precursor functional group can be inhibited and, accordingly, the conversion thereof to the sulfonic acid group can be inhibited by carrying out the emulsion polymerization while adding an acidic compound as an acidifying agent to the polymerization system during polymerization so that the pH of the aqueous medium at the time of completion of the polymerization may be lower than the pH at the time of initiation of the polymerization and, as the pH value of the medium is made lower, the hydrolysis-inhibiting effect increases; for obtaining a more significant effect, the pH of the aqueous medium at the time of completion of the polymerization is preferably lower than 3.0.

In carrying out the production method (2), the pH of the aqueous medium at the time of completion of the polymerization is made more preferably 2.5 or lower, still more preferably 2.0 or lower, particularly preferably 1.8 or lower so that not only the hydrolysis during polymerization may be inhibited but also the hydrolysis of the sulfonic acid precursor functional group in the aqueous fluoropolymer dispersion after completion of the polymerization may be inhibited for a long period of time.

According to the production method (2), the hydrolysis-inhibiting effect is obtained by decreasing the pH value of the aqueous medium to a lower level; however, as the pH of the aqueous medium is lowered, the dispersion stability of the aqueous fluoropolymer dispersion declines. Therefore, the pH of the aqueous fluoropolymer dispersion is preferably not lower than 0.5, more preferably not lower than 0.8, still more preferably not lower than 1.0.

A time of addition of the acidifying agent according to the production method (2) is not particularly restricted but the addition may be properly carried out at any time during polymerization. The frequency of additions is not particularly restricted, either; continuous addition may also be made.

The production methods (1) and (2) each produces the aqueous fluoropolymer dispersion by emulsion polymerization, in the aqueous medium, of the fluoromonomer having the sulfonic acid precursor functional group convertible to the sulfonic acid group.

The emulsion polymerization can be carried out in the conventional manner except for the positive adjustment of the pH to the acidic side, and the polymerization conditions can be properly selected according to the respective monomer species, the amounts thereof and a desired composition, among others. In the emulsion polymerization, a surfactant, a polymerization initiator and/or one or more of other additives can be added.

After aqueous fluoropolymer dispersion production according to the above-mentioned production method (1) or (2), the pH of the aqueous fluoropolymer dispersion may be readjusted to a desired level. In the readjustment, the pH of the aqueous fluoropolymer dispersion is preferably adjusted to a more acidic level. After the production of the aqueous fluoropolymer dispersion, the fluoropolymer dispersed in the aqueous fluoropolymer dispersion may be aggregated in the process of pH adjustment and, in this case, the hydrolysis of the sulfonic acid precursor functional group occurring in the fluoropolymer can be further inhibited.

The aqueous fluoropolymer dispersion produced by the production method (1) or (2) has an acidic pH, so that the hydrolysis of sulfonic acid precursor functional groups is inhibited; therefore, even when the aqueous fluoropolymer dispersion stored for a long period of time is used, the discoloration, on the occasion of melt molding, due to thermal decomposition of sulfonic acid groups ($-SO_3M$) otherwise formed by hydrolysis can be avoided and the dispersion can be suitably used as the electrolyte membrane material.

When it is an aqueous fluoropolymer dispersion produced by the above production method (1) or (2), the aqueous fluoropolymer dispersion may be one without any treatment such as concentration after polymerization or may be one obtained after such after-treatment as concentration and/or coagulation. It may also be an aqueous fluoropolymer dispersion reduced in the proportion of the aqueous medium by subjecting the aqueous fluoropolymer dispersion to coagulation and washing or to coagulation, washing and dehydration.

While the tendency for the sulfonic acid precursor functional group occurring in the fluoromonomer to be hydrolyzed and converted to the sulfonic acid group ($-SO_3M$) increases with the rise of temperature of the aqueous fluoropolymer dispersion, the production method (1) or (2), according to which the pH is adjusted within a specific range on the occasion of polymerization, can inhibit the hydrolysis even upon heating for evaporation of the fluoromonomer and thus can give an improved rate of recovery of the sulfonic acid precursor functional group-containing fluoromonomer.

The aqueous fluoropolymer dispersion production method (3) comprises a step (1) of subjecting the fluoromonomer having the sulfonic acid precursor functional group convertible to the sulfonic acid group to emulsion polymerization to give an aqueous fluoropolymer dispersion and a step (2) of lowering the pH of the aqueous fluoropolymer dispersion.

The production method (3) can inhibit the hydrolysis of sulfonic acid precursor functional groups through positive adjustment of a pH of the aqueous fluoropolymer dispersion to a pH level in a more acidic range in the step (2). Therefore, the aqueous sulfonic acid precursor functional group-containing fluoropolymer dispersion produced by the production method (3) is excellent in the long-term storage stability with respect to the sulfonic acid precursor functional group and, even when the aqueous fluoropolymer dispersion after long-term storage is subjected to such subsequent steps as coagulation, washing and drying and the thus-isolated sulfonic acid precursor functional group-containing fluoropolymer is subjected to melt molding, problems of discoloration and foaming due to the occurrence of sulfonic acid groups can be avoided and the fluoropolymer can be suitably used as the electrolyte membrane material, among others.

The production method (3) includes the step (1) of subjecting the fluoromonomer having the sulfonic acid precursor functional group convertible to the sulfonic acid group to emulsion polymerization to obtain an aqueous fluoropolymer dispersion.

In carrying out the production method (3), the emulsion polymerization can be carried out in the conventional manner, and the polymerization conditions can be properly selected according to the respective monomer species, the amounts thereof and the desired composition, among others.

When it is an aqueous fluoropolymer dispersion obtained in the above-mentioned step (1), the aqueous fluoropolymer dispersion to be used in the step (2) may be one concentrated after polymerization.

It is known, among others, that, in emulsion polymerization for producing the aqueous fluoropolymer dispersion, the aqueous medium is adjusted to a pH around neutrality by adding a buffer agent on the occasion of polymerization, for instance, for the purpose, among others, of maintaining an initiator efficiency in the polymerization at a constant level. In processes for sulfonic acid precursor functional group-containing fluoropolymer production by emulsion polymerization of the fluoromonomer having the sulfonic acid precursor functional group convertible to the sulfonic acid group, for example $-SO_2F$, too, the pH of the aqueous medium is adjusted to the vicinity of neutrality by adding the buffer agent (e.g. $Na_2HPO_4$, $NaH_2PO_4$, etc.) on the occasion of polymerization (cf. e.g. U.S. Pat. No. 4,330,654, Japanese Kokai Publications S63-297406, H11-35624 and 2004-18673, etc.).

According to the production method (3), the pH of the aqueous sulfonic acid precursor functional group-containing fluoropolymer dispersion obtained by emulsion polymerization of the fluoropolymer having the sulfonic acid precursor functional group convertible to the sulfonic acid group is positively adjusted to a more acidic level. The pH adjustment is preferably carried out immediately after completion of the emulsion polymerization reaction and, in that case, the hydrolysis reaction otherwise proceeding during a period after polymerization to such a subsequent step as coagulation can be inhibited.

The production method (3) includes the step (2) of lowering the pH of the aqueous fluoropolymer dispersion, whereby, for example, the hydrolysis and conversion of the sulfonic acid precursor functional group occurring in the product polymer in the aqueous fluoropolymer dispersion to the sulfonic acid group ($-SO_3M$) can be prevented.

While the hydrolysis-inhibiting effect can be increased by reducing a value of the acidic pH of the aqueous sulfonic acid precursor functional group-containing polymer dispersion which is acidic to a lower level, it is preferred, for obtaining a more significant effect, that the pH be lower than 3.0.

When the pH of the aqueous sulfonic acid precursor functional group-containing fluoropolymer dispersion after polymerization is 3.0 or higher, it is preferred that the pH be reduced to a level lower than 3.0, preferably to 2.5 or lower, more preferably to 2.0 or lower, still more preferably to 1.8 or lower, particularly preferably to 1.5 or lower. When the pH of the aqueous sulfonic acid precursor functional group-containing fluoropolymer dispersion after polymerization is lower than 3.0, a further effect can be produced by reducing the pH value to a still lower level. For example, when the aqueous sulfonic acid precursor functional group-containing fluoropolymer dispersion after polymerization has a pH of lower than 3.0 but higher than 2.0, it is preferred that the pH value be reduced to a still lower level, more preferably to 2.0 or lower, still more preferably to 1.8 or lower, particularly preferably to 1.5 or lower. When, for example, the aqueous sulfonic acid precursor functional group-containing fluoropolymer dispersion after polymerization has a pH of lower then 2.0 but higher than 1.8, it is preferred that the pH value be reduced to a still lower level, more preferably to 1.8 or lower, still more preferably to 1.5 or lower.

The aqueous fluoropolymer dispersion produced by the production method (3) is excellent in the long-term storage stability of the sulfonic acid precursor functional groups and, even when the aqueous fluoropolymer dispersion after long-term storage is subjected to such subsequent steps as coagulation, washing and drying and the thus-isolated sulfonic acid precursor functional group-containing fluoropolymer is subjected to melt molding, problems of discoloration and foaming due to the occurrence of the sulfonic acid groups can be avoided and the fluoropolymer can be suitably used as the electrolyte membrane material, among others.

While the tendency for the sulfonic acid precursor functional group occurring in the fluoromonomer to be hydrolyzed and converted to a sulfonic acid group ($-SO_3M$) increases with the rise of temperature of the aqueous fluoropolymer dispersion, the production method (3), according to which the pH is lowered in the step (2), can inhibit the hydrolysis even upon heating for evaporation of the fluoromonomer and thus can give an improved rate of recovery of the sulfonic acid precursor functional group-containing fluoromonomer.

The fluoropolymer isolated from the aqueous medium in the aqueous fluoropolymer dispersion produced by the production method (1), (2) or (3) is very low in the sulfonic acid group ($-SO_3M$) content. Therefore, it hardly absorbs moisture and, owing to its low content of moisture acting as a fluorination-inhibiting factor, the fluorination of the sulfonic acid precursor functional group can be readily carried out and a resulting fluoropolymer is particularly suited for use as the electrolyte membrane material.

The isolation can be realized by coagulating the aqueous fluoropolymer dispersion produced by the method (1), (2) or (3), followed by washing and drying.

Molding of the fluoropolymer can give a molded article, such as membranes.

Effects of the Invention

The recovering method according to the invention has the constitution described hereinabove; therefore, in separating and recovering the fluoromonomer having the sulfonic acid precursor functional group from an aqueous fluoropolymer dispersion obtained by emulsion polymerization, it is unnecessary to use any extraction solvent, a rate of recovery of the unreacted fluoromonomer can be markedly improved and, furthermore, the hydrolysis of the sulfonic acid precursor functional groups during and after recovery can be inhibited.

BEST MODES FOR CARRYING OUT THE INVENTION

The following working examples and comparative examples illustrate the present invention more specifically.

The respective values given in the examples and comparative examples were measured by the following methods.

(1) IR Determination of Mass of $SO_3^-$ in Unit Mass of Polymer

Each fluoropolymer sample obtained by coagulation of an aqueous fluoropolymer dispersion, followed by washing with water and drying was heat-pressed at 270° C. and 10 MPa for 20 minutes to give a 100-μm-thick film, which was subjected to spectrum measurement by the Fourier transform infrared spectroscopic method.

For analyzing the results of the above measurement, a standard sample was separately prepared in the conventional manner by sufficient fluorination until no substantial difference in spectrum was observed any longer, a difference spectrum between the IR spectrum of the standard sample and the IR spectrum of the measurement sample film was derived by C—F overtone absorption peak-based normalization, an intensity of the sulfonic acid group-due absorption peak observable in the vicinity of 1056 cm$^{-1}$ in the difference spectrum obtained was read, and the absorption peak intensity Abs was obtained from each intensity by C—F overtone peak intensity-based normalization.

The sulfonic acid group content was calculated from the extinction coefficient ε (cm$^3$/mol·cm) of the sulfonic acid group-due absorption peak, the density of the sample (g/cm$^3$) and the sample film thickness l (cm) corresponding to the C—F overtone intensity of 1 using Lambert-Beer's law (Abs=εcl, c represents a concentration), as follows:

$$SO_3^-(ppm) = \{Abs \times (\text{molecular weight of } SO_3^-)\} \times 10^{11}/\epsilon dl.$$

In the present specification, the sulfonic acid group content was expressed as the mass of $SO_3^-$ per unit mass of polymer as derived from the value obtained in the above manner.

(2) Sulfonic Acid Precursor Functional Group-Containing Fluoromonomer Unit Content in Fluoropolymer Molten state NMR spectrometry was performed at 300° C., and the proportion (mole percent) to all monomer units taken as 100% and the proportion (% by mass) to the mass of all monomer units were given.

(3) Percentage of Recovery of Fluoromonomer Having Sulfonic Acid Precursor Functional Group Calculation was performed using the following equation:

$$\text{Fluoromonomer recovery (\%)} = [m/(a-c \times w \times p)] \times 100$$

where a=value calculated according to the formula a=($m_0/w_0$)×w,
m=amount of fluoromonomer recovered (g),
$m_0$=amount of fluoromonomer fed (g),
c=fluoropolymer content in virgin aqueous dispersion (% by mass)/100,
w=mass of aqueous fluoropolymer dispersion used for recovering fluoromonomer (g),
$w_0$=mass of virgin aqueous fluoropolymer dispersion (g),
p=fluoromonomer unit content in fluoropolymer (% by mass)/100.

(4) pH Value Measurement

Measurement was performed using a pH meter (product of Hanna Instruments; model Watercheck).

EXAMPLE 1

(1) Synthesis of Fluoropolymer in Aqueous Dispersion

A 6000-ml stainless steel autoclave equipped with a stirrer was charged with 150 g of a 20% (by mass) aqueous solution of $C_7F_{15}COONH_4$ and 2850 g of pure water, followed by sufficient evacuation and nitrogen substitution. After sufficient evacuation of the autoclave, tetrafluoroethylene [TFE] gas was introduced thereinto until a gage pressure of 0.2 MPa, and the temperature was raised to 50° C. Thereafter, 180 g of $CF_2=CFOCF_2CF_2SO_2F$ was injected into the autoclave, and the pressure was raised to 0.7 MPa (gage pressure) by introducing TFE gas thereinto. Then, the polymerization was initiated by injecting an aqueous solution of 1.5 g of ammonium persulfate [APS] in 30 g of pure water into the autoclave.

For supplementing the portion of TFE consumed by polymerization, TFE was continuously fed so that the autoclave inside pressure might be maintained at 0.7 MPa. Further, $CF_2=CFOCF_2CF_2SO_2F$ was continuously fed in an amount corresponding to 65 percent by mass of the TFE fed and the polymerization was thus continued.

After arrival of the amount of TFE fed at 780 g, the autoclave was depressurized and the polymerization was terminated thereby. Then, after cooling to room temperature, 4450 g of a slightly turbid aqueous fluoropolymer dispersion containing about 28% by mass of an $SO_2F$-containing fluoropolymer was obtained. The aqueous fluoropolymer dispersion just after polymerization had a pH of 3.1.

Although the aqueous fluoropolymer dispersion contained the unreacted portion of $CF_2\!=\!CFOCF_2CF_2SO_2F$, the unreacted $CF_2\!=\!CFOCF_2CF_2SO_2F$ was held within fluoropolymer particles in the aqueous fluoropolymer dispersion, hence no layer separation was observed.

(2) Fluoromonomer Recovery

The above aqueous fluoropolymer dispersion (4450 g) just after synthesis was placed in a 6000-ml stainless steel autoclave equipped with a stirrer and, then, 480 g of 0.1 M aqueous nitric acid was added gradually. The pH of the dispersion after addition of aqueous nitric acid was 2.1.

Figure 1:
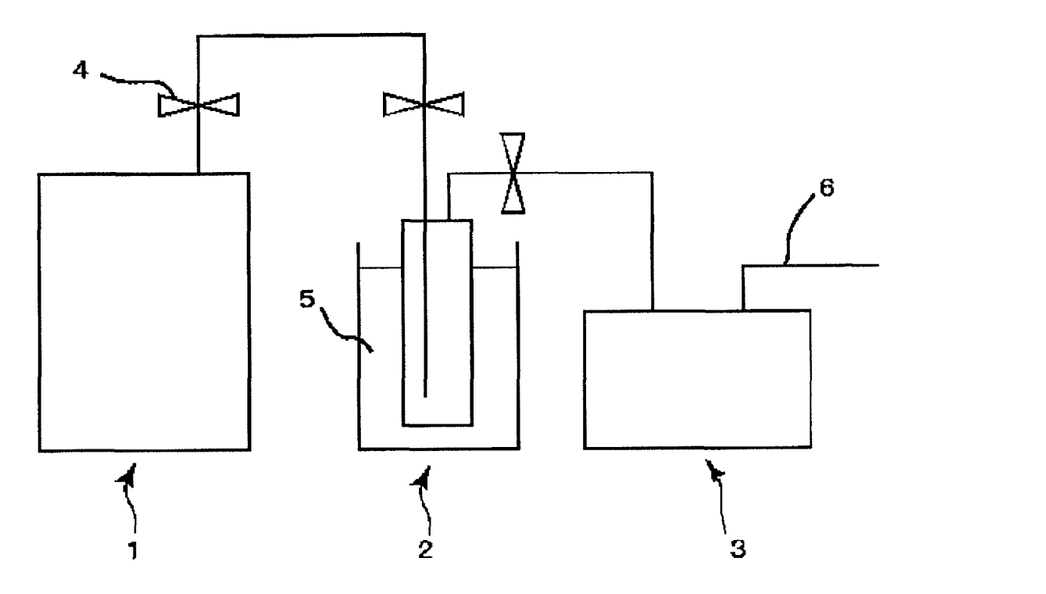
FIG. 1 This is a schematic representation of the manner of connection of a stirred vessel containing an aqueous fluoropolymer dispersion to a trap for recovering a fluoromonomer.

Then, the autoclave was hermetically closed and, using a PFA tube, the gaseous phase part in the stirred vessel was connected to a methanol/dry ice-cooled trap and the trap was connected to a diaphragm pump, as shown in FIG. 1, and the vessel contents were heated at 55° C. under reduced pressure for 2 hours. From the trap, there was obtained 168 g of unreacted $CF_2\!=\!CFOCF_2CF_2SO_2F$.

The aqueous fluoropolymer dispersion just after the recovery of unreacted $CF_2\!=\!CFOCF_2CF_2SO_2F$ was subjected to coagulation with nitric acid, and the coagulum was washed with water and dried at 90° C. for 24 hours and further dried at 120° C. for 12 hours; 1227 g of a fluoropolymer was obtained.

The fluoropolymer was heat-pressed at 270° C. and 10 MPa for 20 minutes to give a 100-μm-thick transparent film.

As a result of IR spectrophotometry, a sulfonic acid-due peak was observed, and the mass of $SO_3^-$ per unit mass of polymer as calculated based on that peak was 50 ppm.

Further, as a result of molten state NMR spectrometry at 300° C., the $CF_2\!=\!CFOCF_2CF_2SO_2F$ unit content in the above fluoropolymer was 19 mole percent (40% by mass).

The fluoromonomer recovery rate was 88%.

EXAMPLE 2

A 6000-ml stainless steel autoclave equipped with a stirrer was charged with 150 g of a 20% (by mass) aqueous solution of $C_7F_{15}COONH_4$ and 2850 g of pure water, followed by sufficient evacuation and nitrogen substitution. After sufficient evacuation of the autoclave, tetrafluoroethylene [TFE] gas was introduced thereinto until a gage pressure of 0.2 MPa, and the temperature was raised to 50° C. Thereafter, 180 g of $CF_2\!=\!CFOCF_2CF_2SO_2F$ was injected into the autoclave, and the pressure was raised to 0.7 MPa (gage pressure) by introducing TFE gas thereinto. Then, the polymerization was initiated by injecting an aqueous solution of 1.5 g of ammonium persulfate [APS] in 30 g of pure water into the autoclave.

For supplementing the portion of TFE consumed by polymerization, TFE was continuously fed so that the autoclave inside pressure might be maintained at 0.7 MPa. Further, $CF_2\!=\!CFOCF_2CF_2SO_2F$ was continuously fed in an amount corresponding to 65 percent by mass of the TFE fed and the polymerization was thus continued.

After arrival of the amount of TFE fed at 780 g, the autoclave was depressurized and the polymerization was terminated thereby; an aqueous fluoropolymer dispersion was obtained. Then, 480 g of 0.1 M aqueous nitric acid was gradually injected into the autoclave by means of nitrogen for pH adjustment. The 103-g portion of the liquid autoclave contents was sampled and measured for pH; the pH was 2.1. Then, using a PFA tube, the gaseous phase part in the stirred vessel was connected to a methanol/dry ice-cooled trap and the trap was connected to a diaphragm pump, as shown in FIG. 1, and the vessel contents were heated at 55° C. under reduced pressure for 2 hours. From the trap, there was obtained 161 g of unreacted $CF_2\!=\!CFOCF_2CF_2SO_2F$. The vessel contents were then cooled to room temperature and 4646 g of a slightly turbid aqueous fluoropolymer dispersion containing about 26% by mass of an $SO_2F$-containing fluoropolymer was obtained.

The aqueous fluoropolymer dispersion just after the recovery of unreacted $CF_2\!=\!CFOCF_2CF_2SO_2F$ was subjected to coagulation with nitric acid, and the coagulum was washed with water and dried at 90° C. for 24 hours and further dried at 120° C. for 12 hours; 1194 g of a fluoropolymer was obtained.

The fluoropolymer was heat-pressed at 270° C. and 10 MPa for 20 minutes to give a 100-μm-thick transparent film.

As a result of IR spectrophotometry, a sulfonic acid-due peak was observed, and the mass of $SO_3^-$ per unit mass of polymer as calculated based on that peak was 60 ppm.

Further, as a result of molten state NMR spectrometry at 300° C., the $CF_2\!=\!CFOCF_2CF_2SO_2F$ unit content in the above fluoropolymer was 19 mole percent (40% by mass). The fluoromonomer recovery rate was 85%. The recovery percentage was the value obtained by calculation estimating, from Example 1 (1), that the mass of the virgin aqueous fluoropolymer dispersion was 4450 g.

EXAMPLE 3

An aqueous fluoropolymer dispersion was obtained by the method of Example 1 (1).

The 2000-g portion of the aqueous fluoropolymer dispersion just after synthesis was placed in a 5000-ml glass-made stirred vessel and then 2000 g of 1 M aqueous nitric acid was gradually added, whereupon the fluoropolymer flocculated and precipitated. The dispersion after the addition of aqueous nitric acid had a pH of 0.4.

Then, using a PFA tube, the gaseous phase part in the stirred vessel was connected to a methanol/dry ice-cooled trap and the trap was connected to a diaphragm pump, as shown in FIG. 1, and the vessel contents were heated at 55° C. for 2 hours. From the trap, there was obtained 75 g of unreacted $CF_2\!=\!CFOCF_2CF_2SO_2F$.

After the recovery of unreacted $CF_2\!=\!CFOCF_2CF_2SO_2F$, the fluoropolymer precipitate was washed with water and dried at 90° C. for 24 hours and further dried at 120° C. for 12 hours; 552 g of a fluoropolymer was obtained.

The fluoropolymer was heat-pressed at 270° C. and 10 MPa for 20 minutes to give a 100-μm-thick transparent film.

As a result of IR spectrophotometry, a sulfonic acid-due peak was observed, and the mass of $SO_3^-$ per unit mass of polymer as calculated based on that peak was 30 ppm.

Further, as a result of molten state NMR spectrometry at 300° C., the $CF_2\!=\!CFOCF_2CF_2SO_2F$ unit content in the above fluoropolymer was 19 mole percent.

The fluoromonomer recovery rate was 88%.

EXAMPLE 4

An aqueous fluoropolymer dispersion was obtained by the method of Example 1 (1).

In a 5000-ml glass-made stirred vessel, there was placed 2000 g of 1 M aqueous nitric acid and then 2000 g of the aqueous fluoropolymer dispersion just after polymerization, whereupon a fluoropolymer flocculated and precipitated. The pH of the dispersion at that time was 0.4.

Then, using a PFA tube, the gaseous phase part in the stirred vessel was connected to a methanol/dry ice-cooled trap and the trap was connected to a diaphragm pump, as shown in FIG. 1, and the vessel contents were heated at 55° C. under reduced pressure for 2 hours. From the trap, there was obtained 78 g of unreacted $CF_2$=$CFOCF_2CF_2SO_2F$.

After the recovery of unreacted $CF_2$=$CFOCF_2CF_2SO_2F$, the fluoropolymer precipitate was washed with water and dried at 90° C. for 24 hours and further dried at 120° C. for 12 hours; 553 g of a fluoropolymer was obtained.

The fluoropolymer was heat-pressed at 270° C. and 10 MPa for 20 minutes to give a 100-μm-thick transparent film.

As a result of IR spectrophotometry, a sulfonic acid-due peak was observed, and the mass of $SO_3^-$ per unit mass of polymer as calculated based on that peak was 30 ppm.

Further, as a result of molten state NMR spectrometry at 300° C., the $CF_2$=$CFOCF_2CF_2SO_2F$ unit content in the above fluoropolymer was 19 mole percent.

The fluoromonomer recovery rate was 91%.

EXAMPLE 5

An aqueous fluoropolymer dispersion was obtained by the method of Example 1 (1).

The above aqueous fluoropolymer dispersion (4450 g) just after synthesis was placed in a 6000-ml stainless steel autoclave equipped with a stirrer and, then, 480 g of 0.2 M aqueous nitric acid was added gradually. The pH of the dispersion after addition of aqueous nitric acid was 1.8.

Then, the autoclave was hermetically closed and, using a PFA tube, the gaseous phase part in the stirred vessel was connected to a methanol/dry ice-cooled trap and the trap was connected to a diaphragm pump, as shown in FIG. 1, and the vessel contents were heated at 55° C. under reduced pressure for 2 hours. From the trap, there was obtained 170 g of unreacted $CF_2$=$CFOCF_2CF_2SO_2F$.

The aqueous fluoropolymer dispersion just after the recovery of unreacted $CF_2$=$CFOCF_2CF_2SO_2F$ was subjected to coagulation with nitric acid, and the coagulum was washed with water and dried at 90° C. for 24 hours and further dried at 120° C. for 12 hours; 1225 g of a fluoropolymer was obtained.

The fluoropolymer was heat-pressed at 270° C. and 10 MPa for 20 minutes to give a 100-μm-thick transparent film.

As a result of IR spectrophotometry, a sulfonic acid-due peak was observed, and the mass of $SO_3^-$ per unit mass of polymer as calculated based on that peak was 40 ppm.

Further, as a result of molten state NMR spectrometry at 300° C., the $CF_2$=$CFOCF_2CF_2SO_2F$ unit content in the above fluoropolymer was 19 mole percent (40% by mass).

The fluoromonomer recovery rate was 88%.

EXAMPLE 6

An aqueous fluoropolymer dispersion was obtained by the method of Example 1 (1).

The above aqueous fluoropolymer dispersion (4450 g) just after synthesis was placed in a 6000-ml stainless steel autoclave equipped with a stirrer and, then, 480 g of 0.4 M aqueous nitric acid was added gradually. The pH of the dispersion after addition of aqueous nitric acid was 1.4.

Then, the autoclave was hermetically closed and, using a PFA tube, the gaseous phase part in the stirred vessel was connected to a methanol/dry ice-cooled trap and the trap was connected to a diaphragm pump, as shown in FIG. 1, and the vessel contents were heated at 55° C. under reduced pressure for 2 hours. From the trap, there was obtained 170 g of unreacted $CF_2$=$CFOCF_2CF_2SO_2F$.

The aqueous fluoropolymer dispersion just after the recovery of unreacted $CF_2$=$CFOCF_2CF_2SO_2F$ was subjected to coagulation with nitric acid, and the coagulum was washed with water and dried at 90° C. for 24 hours and further dried at 120° C. for 12 hours; 1225 g of a fluoropolymer was obtained.

The fluoropolymer was heat-pressed at 270° C. and 10 MPa for 20 minutes to give a 100-μm-thick transparent film.

As a result of IR spectrophotometry, a sulfonic acid-due peak was observed, and the mass of $SO_3^-$ per unit mass of polymer as calculated based on that peak was 30 ppm.

Further, as a result of molten state NMR spectrometry at 300° C., the $CF_2$=$CFOCF_2CF_2SO_2F$ unit content in the above fluoropolymer was 19 mole percent (40% by mass).

The fluoromonomer recovery rate was 88%.

COMPARATIVE EXAMPLE 1

A 6000-ml stainless steel autoclave equipped with a stirrer was charged with 150 g of a 20% (by mass) aqueous solution of $C_7F_{15}COONH_4$ and 2850 g of pure water, followed by sufficient evacuation and nitrogen substitution. After sufficient evacuation of the autoclave, tetrafluoroethylene [TFE] gas was introduced thereinto until a gage pressure of 0.2 MPa, and the temperature was raised to 50° C. Thereafter, 180 g of $CF_2$=$CFOCF_2CF_2SO_2F$ was injected into the autoclave, and the pressure was raised to 0.7 MPa (gage pressure) by introducing TFE gas thereinto. Then, the polymerization was initiated by injecting an aqueous solution of 1.5 g of ammonium persulfate [APS] in 30 g of pure water into the autoclave.

For supplementing the portion of TFE consumed by polymerization, TFE was continuously fed so that the autoclave inside pressure might be maintained at 0.7 MPa. Further, $CF_2$=$CFOCF_2CF_2SO_2F$ was continuously fed in an amount corresponding to 65 percent by mass of the TFE fed and the polymerization was thus continued.

After arrival of the amount of TFE fed at 780 g, the autoclave was depressurized and the polymerization was terminated thereby; an aqueous fluoropolymer dispersion was obtained. Then, using a PFA tube, the gaseous phase part in the stirred vessel was connected to a methanol/dry ice-cooled trap and the trap was connected to a diaphragm pump, as shown in FIG. 1, without taking out the aqueous fluoropolymer dispersion as synthesized, and the vessel contents were heated at 55° C. under reduced pressure for 2 hours. From the trap, there was obtained 125 g of unreacted $CF_2$=$CFOCF_2CF_2SO_2F$. The vessel contents were then cooled to room temperature, and 4269 g of a slightly turbid aqueous fluoropolymer dispersion containing about 28% by mass of an $SO_2F$-containing fluoropolymer was obtained.

The aqueous fluoropolymer dispersion just after the recovery of unreacted $CF_2$=$CFOCF_2CF_2SO_2F$ was subjected to coagulation with nitric acid, and the coagulum was washed with water and dried at 90° C. for 24 hours and further dried at 120° C. for 12 hours; 1230 g of a fluoropolymer was obtained.

The fluoropolymer was heat-pressed at 270° C. and 10 MPa for 20 minutes to give a 100-μm-thick transparent film.

As a result of IR spectrophotometry, a sulfonic acid-due peak was observed, and the mass of $SO_3^-$ per unit mass of polymer as calculated based on that peak was 200 ppm.

Further, as a result of molten state NMR spectrometry at 300° C., the $CF_2$=$CFOCF_2CF_2SO_2F$ unit content in the above fluoropolymer was 19 mole percent.

The fluoromonomer recovery rate was 66%.

COMPARATIVE EXAMPLE 2

An aqueous fluoropolymer dispersion was obtained by the method of Example 1 (1).

In a 6000-ml stainless steel autoclave equipped with a stirrer, there was placed 4450 g of the above aqueous fluoropolymer dispersion just after polymerization and, then, 300 g of a 3% (by mass) aqueous solution of ammonium carbonate was gradually added for maintaining the pH around neutrality. The pH of the dispersion after addition of the aqueous ammonium carbonate solution was 7.7.

Then, the autoclave was hermetically closed and, using a PFA tube, the gaseous phase part in the stirred vessel was connected to a methanol/dry ice-cooled trap and the trap was connected to a diaphragm pump, as shown in FIG. 1, and the vessel contents were heated at 55° C. under reduced pressure for 2 hours. From the trap, there was obtained 109 g of unreacted $CF_2$=$CFOCF_2CF_2SO_2F$.

The aqueous fluoropolymer dispersion just after the recovery of unreacted $CF_2$=$CFOCF_2CF_2SO_2F$ was subjected to coagulation with nitric acid, and the coagulum was washed with water and dried at 90° C. for 24 hours and further dried at 120° C. for 12 hours; 1235 g of a fluoropolymer was obtained.

The fluoropolymer was heat-pressed at 270° C. and 10 MPa for 20 minutes to give a 100-μm-thick transparent film.

As a result of IR spectrophotometry, a sulfonic acid-due peak was observed, and the mass of $SO_3^-$ per unit mass of polymer as calculated based on that peak was 2100 ppm.

Further, as a result of molten state NMR spectrometry at 300° C., the $CF_2$=$CFOCF_2CF_2SO_2F$ unit content in the above fluoropolymer was 19 mole percent.

The fluoromonomer recovery rate was 58%.

REFERENCE EXAMPLE 1

A 6000-ml stainless steel autoclave equipped with a stirrer was charged with 300 g of a 20% (by mass) aqueous solution of $C_7F_{15}COONH_4$, 2700 g of pure water and 2.7 g of $CF_3COOH$. The resulting liquid had a pH of 2.2 as measured using a pH meter (product of Hanna Instruments; model Watercheck). The autoclave was then hermetically closed, followed by sufficient evacuation and nitrogen substitution. After sufficient evacuation of the autoclave, tetrafluoroethylene [TFE] gas was introduced thereinto until a gage pressure of 0.2 MPa, and the temperature was raised to 50° C. Thereafter, 180 g of $CF_2$=$CFOCF_2CF_2SO_2F$ was injected into the autoclave, and the pressure was raised to 0.7 MPa (gage pressure) by introducing TFE gas thereinto. Then, the polymerization was initiated by injecting an aqueous solution of 1.5 g of ammonium persulfate [APS] in 30 g of pure water into the autoclave.

For supplementing the portion of TFE consumed by polymerization, TFE was continuously fed so that the autoclave inside pressure might be maintained at 0.7 MPa. Further, $CF_2$=$CFOCF_2CF_2SO_2F$ was continuously fed in an amount corresponding to 65 percent by mass of the TFE fed and the polymerization was thus continued.

After arrival of the amount of TFE fed at 780 g, the autoclave was depressurized and the polymerization was terminated thereby. Then, after cooling to room temperature, 4445 g of a slightly turbid aqueous fluoropolymer dispersion containing about 28% by mass of an $SO_2F$-containing fluoropolymer was obtained. The pH of the aqueous fluoropolymer dispersion just after polymerization was measured with a pH meter and found to be 2.1.

This aqueous fluoropolymer dispersion was subjected to coagulation with nitric acid, and the coagulum was washed with water and dried at 90° C. for 24 hours and further dried at 120° C. for 12 hours; 1240 g of a fluoropolymer powder was obtained. The fluoropolymer powder was heat-pressed at 270° C. and 10 MPa for 20 minutes to give a 100-μm-thick transparent film.

As a result of IR spectrophotometry, a sulfonic acid-due peak was observed, and the mass of $SO_3^-$ per unit mass of polymer as calculated based on that peak was 30 ppm.

Further, as a result of molten state NMR spectrometry at 300° C., the $CF_2$=$CFOCF_2CF_2SO_2F$ unit content in the above fluoropolymer was 19 mole percent (40% by mass).

REFERENCE EXAMPLE 2

A 6000-ml stainless steel autoclave equipped with a stirrer was charged with 1500 g of a 20% (by mass) aqueous solution of $C_7F_{15}COONH_4$, 1500 g of pure water and 5.8 g of $CF_3COOH$. The resulting liquid had a pH of 1.8. The autoclave was then hermetically closed, followed by sufficient evacuation and nitrogen substitution. After sufficient evacuation of the autoclave, tetrafluoroethylene [TFE] gas was introduced thereinto until a gage pressure of 0.2 MPa, and the temperature was raised to 50° C. Thereafter, 180 g of $CF_2$=$CFOCF_2CF_2SO_2F$ was injected into the autoclave, and the pressure was raised to 0.7 MPa (gage pressure) by introducing TFE gas thereinto. Then, the polymerization was initiated by injecting an aqueous solution of 1.5 g of ammonium persulfate [APS] in 30 g of pure water into the autoclave.

For supplementing the portion of TFE consumed by polymerization, TFE was continuously fed so that the autoclave inside pressure might be maintained at 0.7 MPa. Further, $CF_2$=$CFOCF_2CF_2SO_2F$ was continuously fed in an amount corresponding to 65 percent by mass of the TFE fed and the polymerization was thus continued.

After arrival of the amount of TFE fed at 780 g, the autoclave was depressurized and the polymerization was terminated thereby. The autoclave contents were then cooled to room temperature, and 4450 g of an almost transparent aqueous fluoropolymer dispersion containing about 28% by mass of an $SO_2F$-containing fluoropolymer was obtained. The pH of the aqueous fluoropolymer dispersion just after polymerization was measured with a pH meter and found to be 1.7.

A 440-g portion of this aqueous fluoropolymer dispersion was taken and caused to coagulate with nitric acid, and the coagulum was washed with water and dried at 90° C. for 24 hours and further dried at 120° C. for 12 hours; 120 g of a fluoropolymer powder was obtained. The fluoropolymer powder was heat-pressed at 270° C. and 10 MPa for 20 minutes to give a 100-μm-thick transparent film.

As a result of IR spectrophotometry, no sulfonic acid-due peak was observed.

Further, as a result of molten state NMR spectrometry at 300° C., the $CF_2$=$CFOCF_2CF_2SO_2F$ unit content in the above fluoropolymer was found to be 19 mole percent (40% by mass).

Then, the 445-g portion of the above aqueous fluoropolymer dispersion was taken, 2700 g of pure water and 5.2 g of $CF_3COOH$ were added thereto, and the resulting mixture was fed into a 6000-ml stainless steel autoclave equipped with a stirrer. The pH of the resulting liquid at that time was 1.8. Then, the autoclave was hermetically closed, followed by sufficient evacuation and nitrogen substitution. After sufficient evacuation of the autoclave, 156 g of $CF_2$=$CFOCF_2CF_2SO_2F$ was injected into the autoclave. Then, tetrafluoroethylene [TFE] gas was introduced thereinto until a gage pressure of 0.05 MPa and the temperature was raised to 50° C. Thereafter, the pressure was raised to 0.7 MPa (gage pressure) by introduction of TFE gas. The polymerization was then initiated by injecting an aqueous solution of 1.5 g of ammonium persulfate [APS] in 30 g of pure water into the autoclave.

For supplementing the portion of TFE consumed by polymerization, TFE was continuously fed so that the autoclave inside pressure might be maintained at 0.7 MPa. Further, $CF_2=CFOCF_2CF_2SO_2F$ was continuously fed in an amount corresponding to 65 percent by mass of the TFE fed and the polymerization was thus continued.

After arrival of the amount of TFE fed at 710 g, the autoclave was depressurized and the polymerization was terminated thereby. Then, after cooling to room temperature, 4450 g of a slightly turbid aqueous fluoropolymer dispersion containing about 28% by mass of an $SO_2F$-containing fluoropolymer was obtained. The pH of the aqueous fluoropolymer dispersion just after polymerization was measured with a pH meter and found to be 1.7.

This aqueous fluoropolymer dispersion was subjected to coagulation with nitric acid, and the coagulum was washed with water and dried at 90° C. for 24 hours and further dried at 120° C. for 12 hours; 1240 g of a fluoropolymer powder was obtained.

The fluoropolymer powder was heat-pressed at 270° C. and 10 MPa for 20 minutes to give a 100-μm-thick transparent film.

As a result of IR spectrophotometry, no sulfonic acid-due peak was observed.

Further, as a result of molten state NMR spectrometry at 300° C., the $CF_2=CFOCF_2CF_2SO_2F$ unit content in the above fluoropolymer was found to be 19 mole percent (40% by mass).

REFERENCE EXAMPLE 3

A 500-ml stainless steel autoclave equipped with a stirrer was charged with 250 g of pure water, 0.025 g of $CF_2=CFOCF_2CF(CF_3)OCF_2CF_2COONH_4$, 1.25 g of $F(CF_2)_5COONH_4$ and 0.25 g of $CF_3COOH$. The resulting liquid had a pH of 2.2. The autoclave was then hermetically closed, followed by sufficient evacuation and nitrogen substitution. After sufficient evacuation of the autoclave, tetrafluoroethylene [TFE] gas was introduced thereinto until a gage pressure of 0.2 MPa, and the temperature was raised to 50° C. Thereafter, 15 g of $CF_2=CFOCF_2CF_2SO_2F$ was injected into the autoclave, and the pressure was raised to 0.7 MPa (gage pressure) by introducing TFE gas thereinto. Then, the polymerization was initiated by injecting an aqueous solution of 0.12 g ammonium persulfate [APS] in 10 g of pure water into the autoclave.

For supplementing the portion of TFE consumed by polymerization, TFE was continuously fed so that the autoclave inside pressure might be maintained at 0.7 MPa. Further, $CF_2=CFOCF_2CF_2SO_2F$ was continuously fed in an amount corresponding to 65 percent by mass of the TFE fed and the polymerization was thus continued.

After arrival of the amount of TFE fed at 65 g, the autoclave was depressurized and the polymerization was terminated thereby. Then, after cooling to room temperature, 375 g of a turbid aqueous fluoropolymer dispersion containing about 28% by mass of an $SO_2F$-containing fluoropolymer was obtained.

The pH of the aqueous fluoropolymer dispersion just after polymerization was measured with a pH meter and found to be 2.1.

This aqueous fluoropolymer dispersion was subjected to coagulation with nitric acid, and the coagulum was washed with water and dried at 90° C. for 24 hours and further dried at 120° C. for 12 hours; 103 g of a fluoropolymer powder was obtained.

The fluoropolymer powder was heat-pressed at 270° C. and 10 MPa for 20 minutes to give a 100-μm-thick transparent film.

As a result of IR spectrophotometry, a sulfonic acid-due peak was observed, and the mass of $SO_3^-$ per unit mass of polymer as calculated based on that peak was 30 ppm.

Further, as a result of molten state NMR spectrometry at 300° C., the $CF_2=CFOCF_2CF_2SO_2F$ unit content in the above fluoropolymer was 19 mole percent (40% by mass).

REFERENCE EXAMPLE 4

A 6000-ml stainless steel autoclave equipped with a stirrer was charged with 1500 g of a 20% (by mass) aqueous solution of $C_7F_{15}COONH_4$, 1500 g of pure water and 15.0 g of $CF_3COOH$. The pH of the resulting liquid as measured with a pH meter (product of Hanna Instruments; model Watercheck) was 1.4. The autoclave was then hermetically closed, followed by sufficient evacuation and nitrogen substitution. After sufficient evacuation of the autoclave, tetrafluoroethylene [TFE] gas was introduced thereinto until a gage pressure of 0.2 MPa, and the temperature was raised to 50° C. Thereafter, 180 g of $CF_2=CFOCF_2CF_2SO_2F$ was injected into the autoclave, and the pressure was raised to 0.7 MPa (gage pressure) by introducing TFE gas thereinto. Then, the polymerization was initiated by injecting an aqueous solution of 1.5 g of ammonium persulfate [APS] in 30 g of pure water into the autoclave.

For supplementing the portion of TFE consumed by polymerization, TFE was continuously fed so that the autoclave inside pressure might be maintained at 0.7 MPa. Further, $CF_2=CFOCF_2CF_2SO_2F$ was continuously fed in an amount corresponding to 65 percent by mass of the TFE fed and the polymerization was thus continued.

After arrival of the amount of TFE fed at 780 g, the autoclave was depressurized and the polymerization was terminated thereby. Then, after cooling to room temperature, 4445 g of a slightly turbid aqueous fluoropolymer dispersion containing about 28% by mass of an $SO_2F$-containing fluoropolymer was obtained. The pH of the aqueous fluoropolymer dispersion just after polymerization was measured with a pH meter and found to be 1.3.

This aqueous fluoropolymer dispersion was subjected to coagulation with nitric acid, and the coagulum was washed with water and dried at 90° C. for 24 hours and further dried at 120° C. for 12 hours; 1240 g of a fluoropolymer powder was obtained.

The fluoropolymer powder was heat-pressed at 270° C. and 10 MPa for 20 minutes to give a 100-μm-thick transparent film.

As a result of IR spectrophotometry, no sulfonic acid-due peak was observed.

Further, as a result of molten state NMR spectrometry at 300° C., the $CF_2=CFOCF_2CF_2SO_2F$ unit content in the above fluoropolymer was found to be 19 mole percent (40% by mass).

REFERENCE EXAMPLE 5

A 6000-ml stainless steel autoclave equipped with a stirrer was charged with 300 g of a 20% (by mass) aqueous solution of $C_7F_{15}COONH_4$, 2700 g of pure water and 2.5 g of nitric acid (60% by weight). The pH of the resulting liquid as measured with a pH meter (product of Hanna Instruments; model Watercheck) was 2.2. The autoclave was then hermetically closed, followed by sufficient evacuation and nitrogen substitution. After sufficient evacuation of the autoclave, tetrafluoroethylene [TFE] gas was introduced thereinto until a gage pressure of 0.2 MPa, and the temperature was raised to 50° C. Thereafter, 180 g of $CF_2=CFOCF_2CF_2SO_2F$ was injected into the autoclave, and the pressure was raised to 0.7 MPa (gage pressure) by introducing TFE gas thereinto. Then, the polymerization was initiated by injecting an aqueous solution of 1.5 g of ammonium persulfate [APS] in 30 g of pure water into the autoclave.

For supplementing the portion of TFE consumed by polymerization, TFE was continuously fed so that the autoclave inside pressure might be maintained at 0.7 MPa. Further, $CF_2=CFOCF_2CF_2SO_2F$ was continuously fed in an amount corresponding to 65 percent by mass of the TFE fed and the polymerization was thus continued.

After arrival of the amount of TFE fed at 780 g, the autoclave was depressurized and the polymerization was terminated thereby. Then, after cooling to room temperature, 4445 g of a slightly turbid aqueous fluoropolymer dispersion containing about 28% by mass of an $SO_2F$-containing fluoropolymer was obtained. The pH of the aqueous fluoropolymer dispersion just after polymerization was measured with a pH meter and found to be 2.0.

This aqueous fluoropolymer dispersion was subjected to coagulation with nitric acid, and the coagulum was washed with water and dried at 90° C. for 24 hours and further dried at 120° C. for 12 hours; 1240 g of a fluoropolymer powder was obtained. The fluoropolymer powder was heat-pressed at 270° C. and 10 MPa for 20 minutes to give a 100-µm-thick transparent film.

As a result of IR spectrophotometry, no sulfonic acid-due peak was observed.

Further, as a result of molten state NMR spectrometry at 300° C., the $CF_2=CFOCF_2CF_2SO_2F$ unit content in the above fluoropolymer was found to be 19 mole percent (40% by mass).

REFERENCE EXAMPLE 6

A 6000-ml stainless steel autoclave equipped with a stirrer was charged with 300 g of a 20% (by mass) aqueous solution of $C_7F_{15}COONH_4$ and 2700 g of pure water. The pH of the resulting liquid at that time was 6.5. The autoclave was then hermetically closed, followed by sufficient evacuation and nitrogen substitution. After sufficient evacuation of the autoclave, tetrafluoroethylene [TFE] gas was introduced thereinto until a gage pressure of 0.2 MPa, and the temperature was raised to 50° C. Thereafter, 180 g of $CF_2=CFOCF_2CF_2SO_2F$ was injected into the autoclave, and the pressure was raised to 0.7 MPa (gage pressure) by introducing TFE gas thereinto. Then, the polymerization was initiated by injecting an aqueous solution of 1.5 g of ammonium persulfate [APS] in 30 g of pure water into the autoclave.

For supplementing the portion of TFE consumed by polymerization, TFE was continuously fed so that the autoclave inside pressure might be maintained at 0.7 MPa. Further, $CF_2=CFOCF_2CF_2SO_2F$ was continuously fed in an amount corresponding to 65 percent by mass of the TFE fed and the polymerization was thus continued.

At the point of time when the amount of TFE fed arrived at 39 g, an aqueous solution of 3.4 g of $CF_3COOH$ in 50 g of pure water was gradually injected into the autoclave. Then, a 50-g portion of the autoclave inside liquid was sampled from a sampling tube and the pH thereof was measured with a pH meter; the liquid pH was 2.0.

The polymerization was further continued and, after arrival of the amount of TFE fed at 780 g, the autoclave was depressurized and the polymerization was terminated thereby. Then, after cooling to room temperature, 4450 g of a slightly turbid aqueous fluoropolymer dispersion containing about 28% by mass of an $SO_2F$-containing fluoropolymer was obtained. The pH of the aqueous fluoropolymer dispersion was measured with a pH meter and found to be 1.9.

This aqueous fluoropolymer dispersion was subjected to coagulation with nitric acid, and the coagulum was washed with water and dried at 90° C. for 24 hours and further dried at 120° C. for 12 hours; 1230 g of a fluoropolymer powder was obtained.

The fluoropolymer powder was heat-pressed at 270° C. and 10 MPa for 20 minutes to give a 100-µm-thick transparent film.

As a result of IR spectrophotometry, no sulfonic acid-due peak was observed.

Further, as a result of molten state NMR spectrometry at 300° C., the $CF_2=CFOCF_2CF_2SO_2F$ unit content in the above fluoropolymer was found to be 19 mole percent (40% by mass).

REFERENCE EXAMPLE 7

A 6000-ml stainless steel autoclave equipped with a stirrer was charged with 1500 g of a 20% (by mass) aqueous solution of $C_7F_{15}COONH_4$ and 1500 g of pure water. The pH of the resulting liquid at that time was 6.5. The autoclave was hermetically closed, followed by sufficient evacuation and nitrogen substitution. After sufficient evacuation of the autoclave, tetrafluoroethylene [TFE] gas was introduced thereinto until a gage pressure of 0.2 MPa, and the temperature was raised to 50° C. Thereafter, 180 g of $CF_2=CFOCF_2CF_2SO_2F$ was injected into the autoclave, and the pressure was raised to 0.7 MPa (gage pressure) by introducing TFE gas thereinto. Then, the polymerization was initiated by injecting an aqueous solution of 1.5 g of ammonium persulfate [APS] in 30 g of pure water into the autoclave.

For supplementing the portion of TFE consumed by polymerization, TFE was continuously fed so that the autoclave inside pressure might be maintained at 0.7 MPa. Further, $CF_2=CFOCF_2CF_2SO_2F$ was continuously fed in an amount corresponding to 65 percent by mass of the TFE fed and the polymerization was thus continued.

At the time when the amount of TFE fed arrived at 39 g, an aqueous solution of 15.0 g of $CF_3COOH$ in 50 g of pure water was gradually injected into the autoclave. Then, a 50-g portion of the autoclave inside liquid was sampled from a sampling tube and the pH thereof was measured with a pH meter; the liquid pH was 1.4.

The polymerization was further continued and, after arrival of the amount of TFE fed at 780 g, the autoclave was depressurized and the polymerization was terminated thereby. Then, after cooling to room temperature, 4460 g of a slightly turbid aqueous fluoropolymer dispersion containing about 28% by mass of an $SO_2F$-containing fluoropolymer was obtained. The pH of the aqueous fluoropolymer dispersion was measured with a pH meter and found to be 1.3.

This aqueous fluoropolymer dispersion was subjected to coagulation with nitric acid, and the coagulum was washed with water and dried at 90° C. for 24 hours and further dried at 120° C. for 12 hours; 1230 g of a fluoropolymer powder was obtained.

The fluoropolymer powder was heat-pressed at 270° C. and 10 MPa for 20 minutes to give a 100-μm-thick transparent film.

As a result of IR spectrophotometry, no sulfonic acid-due peak was observed.

Further, as a result of molten state NMR spectrometry at 300° C., the $CF_2=CFOCF_2CF_2SO_2F$ unit content in the above fluoropolymer was found to be 19 mole percent (40% by mass).

COMPARATIVE REFERENCE EXAMPLE 1

A 6000-ml stainless steel autoclave equipped with a stirrer was charged with 300 g of a 20% (by mass) aqueous solution of $C_7F_{15}COONH_4$, 2700 g of pure water, 24.0 g of $Na_2HPO_4.12H_2O$ and 13.6 g of $NaH_2PO_4.2H_2O$. The pH of the resulting liquid at that time was 7.0. The autoclave was then hermetically closed, followed by sufficient evacuation and nitrogen substitution. After sufficient evacuation of the autoclave, tetrafluoroethylene [TFE] gas was introduced thereinto until a gage pressure of 0.2 MPa, and the temperature was raised to 50° C. Thereafter, 180 g of $CF_2=CFOCF_2CF_2SO_2F$ was injected into the autoclave, and the pressure was raised to 0.7 MPa (gage pressure) by introducing TFE gas thereinto. Then, the polymerization was initiated by injecting an aqueous solution of 1.5 g of ammonium persulfate [APS] in 30 g of pure water into the autoclave.

For supplementing the portion of TFE consumed by polymerization, TFE was continuously fed so that the autoclave inside pressure might be maintained at 0.7 MPa. Further, $CF_2=CFOCF_2CF_2SO_2F$ was continuously fed in an amount corresponding to 65 percent by mass of the TFE fed and the polymerization was thus continued.

After arrival of the amount of TFE fed at 780 g, the autoclave was depressurized and the polymerization was terminated thereby. Then, after cooling to room temperature, 4445 g of a slightly turbid aqueous fluoropolymer dispersion containing about 28% by mass of an $SO_2F$-containing fluoropolymer was obtained.

This aqueous fluoropolymer dispersion was subjected to coagulation with nitric acid, and the coagulum was washed with water and dried at 90° C. for 24 hours and further dried at 120° C. for 12 hours; 1240 g of a fluoropolymer powder was obtained. The fluoropolymer powder was heat-pressed at 270° C. and 10 MPa for 20 minutes to give a 100-μm-thick transparent film.

As a result of IR spectrophotometry, a sulfonic acid-due peak was observed, and the mass of $SO_3^-$ per unit mass of polymer as calculated based on that peak was 350 ppm.

Further, as a result of molten state NMR spectrometry at 300° C., the $CF_2=CFOCF_2CF_2SO_2F$ unit content in the above fluoropolymer was 19 mole percent (40% by mass).

COMPARATIVE REFERENCE EXAMPLE 2

A 6000-ml stainless steel autoclave equipped with a stirrer was charged with 300 g of a 20% (by mass) aqueous solution of $C_7F_{15}COONH_4$ and 2700 g of pure water. The pH of the resulting liquid at that time was 6.5. The autoclave was then hermetically closed, followed by sufficient evacuation and nitrogen substitution. After sufficient evacuation of the autoclave, tetrafluoroethylene [TFE] gas was introduced thereinto until a gage pressure of 0.2 MPa, and the temperature was raised to 50° C. Thereafter, 180 g of $CF_2=CFOCF_2CF_2SO_2F$ was injected into the autoclave, and the pressure was raised to 0.7 MPa (gage pressure) by introducing TFE gas thereinto. Then, the polymerization was initiated by injecting an aqueous solution of 1.5 g of ammonium persulfate [APS] in 30 g of pure water into the autoclave.

For supplementing the portion of TFE consumed by polymerization, TFE was continuously fed so that the autoclave inside pressure might be maintained at 0.7 MPa. Further, $CF_2=CFOCF_2CF_2SO_2F$ was continuously fed in an amount corresponding to 65 percent by mass of the TFE fed and the polymerization was thus continued.

After arrival of the amount of TFE fed at 780 g, the autoclave was depressurized and the polymerization was terminated thereby. Then, after cooling to room temperature, 4450 g of a slightly turbid aqueous fluoropolymer dispersion containing about 28% by mass of an $SO_2F$-containing fluoropolymer was obtained. The aqueous fluoropolymer dispersion had a pH of 3.1.

This aqueous fluoropolymer dispersion was subjected to coagulation with nitric acid, and the coagulum was washed with water and dried at 90° C. for 24 hours and further dried at 120° C. for 12 hours; 1240 g of a fluoropolymer powder was obtained.

The fluoropolymer powder was heat-pressed at 270° C. and 10 MPa for 20 minutes to give a 100-μm-thick transparent film.

As a result of IR spectrophotometry, a sulfonic acid-due peak was observed, and the mass of $SO_3^-$ per unit mass of polymer as calculated based on that peak was 150 ppm.

Further, as a result of molten state NMR spectrometry at 300° C., the $CF_2=CFOCF_2CF_2SO_2F$ unit content in the above fluoropolymer was 19 mole percent (40% by mass).

REFERENCE EXAMPLE 8

Step (1)

A 6000-ml stainless steel autoclave equipped with a stirrer was charged with 150 g of a 20% (by mass) aqueous solution of $C_7F_{15}COONH_4$ and 2850 g of pure water, followed by sufficient evacuation and nitrogen substitution. After sufficient evacuation of the autoclave, tetrafluoroethylene [TFE] gas was introduced thereinto until a gage pressure of 0.2 MPa, and the temperature was raised to 50° C. Thereafter, 180 g of $CF_2=CFOCF_2CF_2SO_2F$ was injected into the autoclave, and the pressure was raised to 0.7 MPa (gage pressure) by introducing TFE gas thereinto. Then, the polymerization was initiated by injecting an aqueous solution of 1.5 g of ammonium persulfate [APS] in 30 g of pure water into the autoclave.

For supplementing the portion of TFE consumed by polymerization, TFE was continuously fed so that the autoclave inside pressure might be maintained at 0.7 MPa. Further, $CF_2=CFOCF_2CF_2SO_2F$ was continuously fed in an amount corresponding to 65 percent by mass of the TFE fed and the polymerization was thus continued.

After arrival of the amount of TFE fed at 780 g, the autoclave was depressurized and the polymerization was terminated thereby. Then, after cooling to room temperature, 4450 g of a slightly turbid aqueous fluoropolymer dispersion containing about 28% by mass of an $SO_2F$-containing fluoropolymer was obtained. The pH of the aqueous fluoropolymer dispersion just after polymerization had a pH of 3.1 as measured with a pH meter (product of Hanna Instruments; model Watercheck).

Step (2)

To 350 g of the aqueous fluoropolymer dispersion as obtained in the step (1) just after polymerization was added gradually 50 g of 0.2 M aqueous sulfuric acid. The pH of the dispersion after addition of aqueous sulfuric acid was 1.3. On that occasion, the aqueous fluoropolymer dispersion showed no sign of coagulation.

The aqueous fluoropolymer dispersion after pH adjustment was allowed to stand in an atmosphere maintained at 50° C. and, after the lapse of 6 hours, 24 hours and 120 hours, 50-g portions of the aqueous fluoropolymer dispersion were respectively sampled. To each sample was added 10 g of nitric acid for causing coagulation, and the coagulum polymer was washed with water and dried at 100° C. for 24 hours to give a polymer sample.

Each polymer sample obtained was subjected to IR spectrophotometry, and the mass of $SO_3^-$ per unit mass of polymer was calculated. The results thus obtained are shown in Table 1.

Further, as a result of molten state NMR spectrometry at 300° C., the $CF_2$=$CFOCF_2CF_2SO_2F$ unit content in the above fluoropolymer was 19 mole percent (40% by mass).

COMPARATIVE REFERENCE EXAMPLE 3

The 350-g portion of the aqueous fluoropolymer dispersion of Reference Example 8 just after synthesis, without any pH adjustment such as addition of an acid, was allowed to stand in an atmosphere maintained at 50° C. and, after the lapse of 6 hours, 24 hours and 120 hours, 50-g portion of the aqueous fluoropolymer dispersion were respectively sampled. To each sample was added 10 g of nitric acid for causing coagulation, and the coagulum polymer was washed with water and dried at 100° C. for 24 hours to give a polymer sample.

Each polymer sample obtained was subjected to IR spectrophotometry, and the mass of $SO_3^-$ per unit mass of polymer was calculated. The results thus obtained are shown in Table 1.

COMPARATIVE REFERENCE EXAMPLE 4

To 350 g of the aqueous fluoropolymer dispersion just after synthesis as obtained in Reference Example 8 was added gradually 50 g of a 0.2 M aqueous solution of ammonium carbonate. Just after addition of the aqueous ammonium carbonate solution, the pH of the dispersion was 7.6.

The aqueous fluoropolymer dispersion after pH adjustment was allowed to stand in an atmosphere maintained at 50° C. and, after the lapse of 6 hours, 24 hours and 120 hours, 50-g portions of the aqueous fluoropolymer dispersion were respectively sampled. To each sample was added 20 g of nitric acid for causing coagulation, and the coagulum polymer was washed with water and dried at 100° C. for 24 hours to give a polymer sample. Each polymer sample obtained was subjected to IR spectrophotometry, and the mass of $SO_3^-$ per unit mass of polymer was calculated. The results thus obtained are shown in Table 1.

TABLE 1

| | Additive | Storage temperature (° C.) | Time of storage (hours) | $SO_3^-$ content (ppm) |
|---|---|---|---|---|
| Referecne Example 8 | Sulfuric acid | 50 | 6 | $1.3 \times 10^2$ |
| | | | 24 | $1.4 \times 10^2$ |
| | | | 120 | $1.2 \times 10^2$ |
| Comparative Reference Example 3 | None | 50 | 6 | $1.8 \times 10^2$ |
| | | | 24 | $3.2 \times 10^2$ |
| | | | 120 | $6.2 \times 10^2$ |
| Comparative Reference Example 4 | Ammonium carbonate | 50 | 6 | $8.0 \times 10^2$ |
| | | | 24 | $1.3 \times 10^3$ |
| | | | 120 | $3.2 \times 10^3$ |

REFERENCE EXAMPLE 9

Step (1)

A 6000-ml stainless steel autoclave equipped with a stirrer was charged with 300 g of a 20% (by mass) aqueous solution of $C_7F_{15}COONH_4$, 2700 g of pure water, 24.0 g of $Na_2HPO_4 \cdot 12H_2O$ and 13.6 g of $NaH_2PO_4 \cdot 2H_2O$. The autoclave was then hermetically closed, followed by sufficient evacuation and nitrogen substitution. After sufficient evacuation of the autoclave, tetrafluoroethylene [TFE] gas was introduced thereinto until a gage pressure of 0.2 MPa, and the temperature was raised to 50° C. Thereafter, 180 g of $CF_2$=$CFOCF_2CF_2SO_2F$ was injected into the autoclave, and the pressure was raised to 0.7 MPa (gage pressure) by introducing TFE gas thereinto. Then, the polymerization was initiated by injecting an aqueous solution of 1.5 g of ammonium persulfate [APS] in 30 g of pure water into the autoclave.

For supplementing the portion of TFE consumed by polymerization, TFE was continuously fed so that the autoclave inside pressure might be maintained at 0.7 MPa. Further, $CF_2$=$CFOCF_2CF_2SO_2F$ was continuously fed in an amount corresponding to 65 percent by mass of the TFE fed and the polymerization was thus continued.

After arrival of the amount of TFE fed at 780 g, the autoclave was depressurized and the polymerization was terminated thereby. Then, after cooling to room temperature, 4460 g of a slightly turbid aqueous fluoropolymer dispersion containing about 28% by mass of an $SO_2F$-containing fluoropolymer was obtained. The pH of the aqueous fluoropolymer dispersion just after polymerization was measured with a pH meter (product of Hanna Instruments; model Watercheck) and found to be 6.8.

Step (2)

To 350 g of the aqueous fluoropolymer dispersion just after synthesis as obtained in step (1) was added gradually 63 g of a 0.2 M aqueous sulfuric acid. After addition of the aqueous sulfuric acid, the pH of the dispersion was 1.3. On that occasion, the aqueous fluoropolymer dispersion showed no sign of coagulation.

The aqueous fluoropolymer dispersion after pH adjustment was allowed to stand in an atmosphere maintained at 50° C. and, after the lapse of 6 hours, 24 hours and 120 hours, 50-g portions of the aqueous fluoropolymer dispersion were respectively sampled. To each sample was added 10 g of nitric acid for causing coagulation, and the coagulum polymer was washed with water and dried at 100° C. for 24 hours to give a polymer sample.

Each polymer sample obtained was subjected to IR spectrophotometry, and the mass of $SO_3^-$ per unit mass of polymer was calculated. The results thus obtained are shown in Table 2.

Further, as a result of molten state NMR spectrometry at 300° C., the $CF_2$=$CFOCF_2CF_2SO_2F$ unit content in the above fluoropolymer was 19 mole percent (40% by mass).

TABLE 2

| | Additive | Storage temperature (° C.) | Time of storage (hours) | $SO_3^-$ content (ppm) |
|---|---|---|---|---|
| Referecne Example 9 | Buffer -> + Sulfuric acid | 50 | 6 | $3.5 \times 10^2$ |
| | | | 24 | $3.6 \times 10^2$ |
| | | | 120 | $3.6 \times 10^2$ |

Industrial Applicability

The method of recover according to the invention can be suitably used in the manufacture of electrolyte membrane materials for use in fuel cells, chemical sensors and so forth.

EXPLANATION OF SYMBOLS

1—Stirred vessel
2—Trap
3—Diaphragm pump
4—Valve
5—Methanol/dry ice
6—Exhaust pipe

The invention claimed is:

1. A recovering method of a fluoromonomer having a sulfonic acid precursor functional group convertible to a sulfonic acid group and remaining unreacted from an aqueous fluoropolymer dispersion obtained by emulsion polymerization of the fluoromonomer,
which comprises recovering the unreacted fluoromonomer from the aqueous fluoropolymer dispersion by heating so as to evaporate the unreacted fluoromonomer,
the aqueous fluoropolymer dispersion having an acidic pH, and
wherein the aqueous fluoropolymer dispersion is one obtained by emulsion polymerization of the fluoromonomer in an aqueous medium having a pH of not lower than 0.5 but lower than 3.0 or one obtained by emulsion polymerization during which an acidic compound is added to the polymerization system in order to lower the pH of the aqueous medium at the time of completion of the polymerization to the pH at the time of initiation of the polymerization.

2. The recovering method according to claim 1,
wherein the aqueous fluoropolymer dispersion has a pH lower than 3.0.

3. The recovering method according to claim 1,
wherein the sulfonic acid precursor functional group-containing fluoromonomer is a fluorovinyl compound represented by the general formula (I):

$$CF_2=CF-(A)_l-(CF_2CFY^1-O)_n-(CFY^2)_m-SO_2X \qquad (I)$$

wherein $Y^1$ represents F, Cl or a perfluoroalkyl group; n is 0 or 1; $Y^2$ represents F, Cl or a perfluoroalkyl group; m represents an integer of 0 to 5 when n is 0 or represents an integer of 1 to 5 when n is 1 and, when m represents an integer of 2 to 5, the m atoms of $Y^2$ may be the same or different; X represents F or Cl; A represents —O— or —$CF_2O$—; and l is 0 or 1.

4. The recovering method according to claim 1,
wherein the aqueous fluoropolymer dispersion is one obtained by emulsion polymerization of the sulfonic acid precursor functional group-containing fluoromonomer and an ethylenic fluoromonomer.

* * * * *